April 8, 1969
J. B. KILLEBREW
3,437,076
ENERGY CONVERSION APPARATUS AND SYSTEM
Filed Sept. 21, 1967
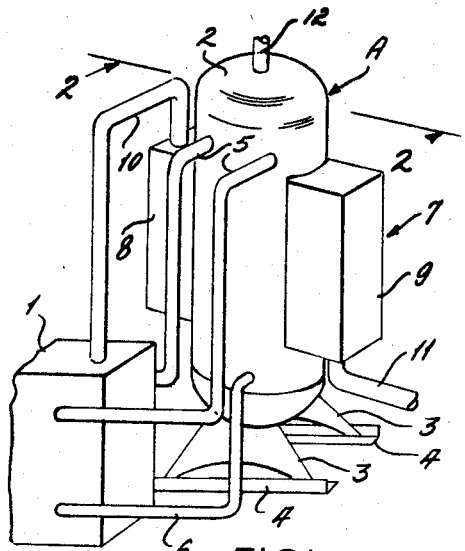
FIG.1
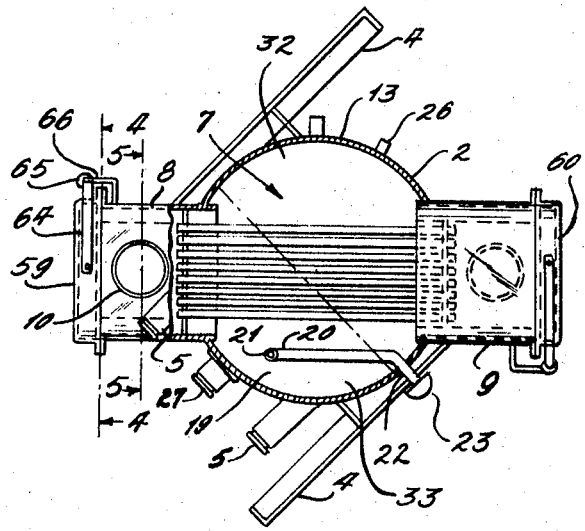
FIG.3
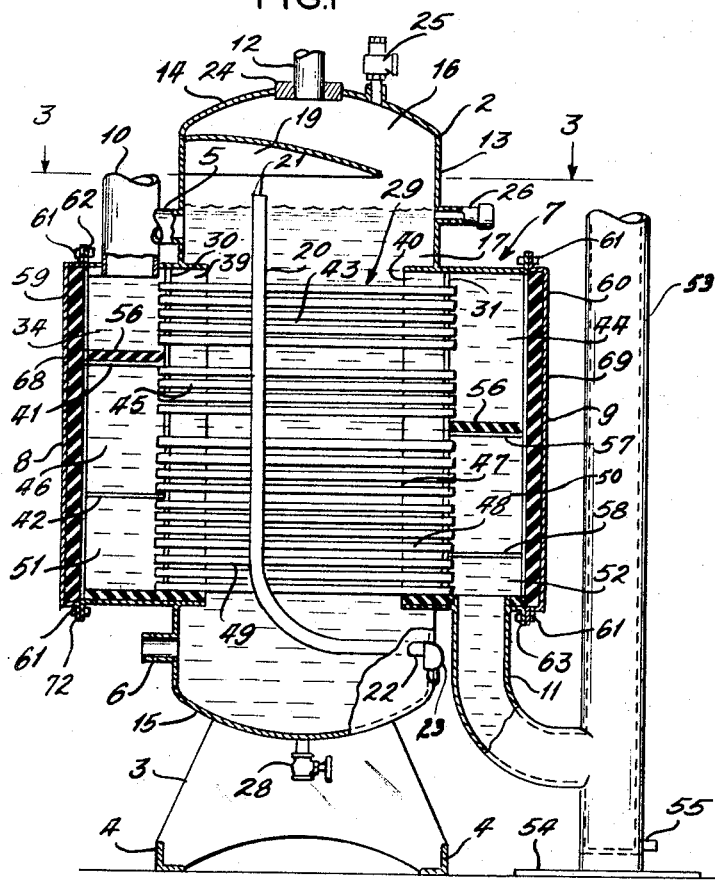
FIG.2
FIG.4
INVENTOR:
JOSEPH B. KILLEBREW
BY 
ATTORNEY, INVENTOR:
JOSEPH B. KILLEBREW
BY
Paul M. Denk
ATTORNEY.

United States Patent Office 3,437,076
Patented Apr. 8, 1969

3,437,076
ENERGY CONVERSION APPARATUS
AND SYSTEM
Joseph B. Killebrew, Eureka, Mo., assignor to Killebrew Engineering Corporation, St. Louis, Mo., a corporation of Missouri
Filed Sept. 21, 1967, Ser. No. 669,558
Int. Cl. F22d 1/16
U.S. Cl. 122—7                                  12 Claims

ABSTRACT OF THE DISCLOSURE

An energy conversion apparatus which produces supplemental energy when used in conjunction with a combustion engine. The apparatus has a vertically disposed receptacle which receives the hot liquid or other cooling medium from the jacket of the engine, and provides for its separation into the vapor and liquid states. The liquefied cooling medium is further heated and partially vaporized by channelling the exhaust gases from the engine for single or multiple passes through a tube bundle arranged through the liquid space of the receptacle, and the yet remaining liquid phase is then returned to the engine jacket for cooling purposes. The created vapor is conveyed from the apparatus as an energy source for operation of other devices located remotely. A pair or more of the apparatuses, and their associated engines, may be used jointly and interconnected by a series of flow lines, so that as one apparatus may be functioning, the inactive or idle apparatus may be conveniently primed for ready usage at a proper start-up temperature and water level.

BACKGROUND OF THE INVENTION

This invention relates in general to an energy conversion apparatus, and more particularly, pertains to an apparatus constructed as a compact unit that functions in conjunction with a connecting combustion engine or the like to enhance vaporization of the circulating liquid cooling medium of said engine and thereby create a supplemental source of energy.

The objective of furnishing energy from a localized power source, and utilizing and complementing this source in a manner which emphasizes the total energy concept, as distinct from the common practice of having energy such as electricity, and the like, conveyed from a remote source, is coming into a more frequent usage. The total energy concept contemplates that most forms of energy, such as enumerated, may be prepared from a proximate energy source located locally upon the premises where light, heat, space conditioning, and other similar utilities, are required. The core of such a system usually employs a prime mover, such as an internal combustion engine or gas turbine, which operates on-site by use of any of a variety of fuels, and principally provides the torque for operation of, for example, a shaft-connected generator, resulting in the generation of electricity. Simultaneously, as is known, the jacket fluid or water used for cooling the engine becomes heated during this operation, and a certain percentage of said jacket water emanating from said engine flashes to steam at a temperature and pressure that renders it useful for other purposes, such as for heating, a source of hot water, or for serving absorption type refrigeration equipment.

Heretofore, to aid in the process of achieving vaporization of the engine jacket cooling liquid, a vapor separator would be connected with the engine and receive the heated liquid, mainly by convection, and by swirling said liquid centrifugally within the separator, eventually cause the vapor and remaining liquid to segregate. The vapor could then be used for other purposes, for example, as those previously mentioned. Only more recently has there been any attempt to improve upon this energy conversion operation with the objective of attaining operational efficiency in the functioning of the total energy system. It has now become recognized, in this total energy field, that the heat of the exhaust gases emanating from the combustion engine may be salvaged and employed for further heating the cooling system liquid and therein create additional vapor. Ordinarily, this exhaust gas was simply wasted, but the use of it as in the foregoing manner provides a recovery of previously lost energy. As presently utilized, the exhaust gases are channelled through a heat exchanger that is arranged apart from the vapor separator, with some of the remaining liquid in the separator being conveyed through the exchanger for creating additional vapor. This arrangement is desirable from the standpoint of providing supplemental heating and vaporizing of the cooling liquid, but the operation fails to achieve overall maximum operational efficiency, and in addition, certain other problems are inherent, especially in the area of regulation and control of the heated cooling medium and the induced vapor.

It is an object of this invention to provide an energy conversion apparatus formed into a packaged unit that flashes into vapor the heated cooling medium of an interconnected combustion engine, and provides for the creation directly therein of additional vapor through the supplemental heating of said medium through the agency of hot exhaust gases emanating from the engine.

It is another object of this invention to provide for the formation of vapor, conjointly through the processes of flashing and simultaneous heating, totally within a unitarily constructed energy conversion apparatus only employing the instrumentalities associated with the operation of an internal combustion engine or gas turbine.

It is a further object of the invention to increase the efficiency of formation of vapor in an energy conversion apparatus utilizing the liquid cooling medium and exhaust gases of a combustion engine.

It is still another object of this invention to provide an energy conversion apparatus which inherently muffles the loud noises associated with the operation of a combustion engine as transmitted with the conveyance of its exhaust gases, while simultaneously providing a heat exchange relationship between said exhaust gases and the liquid cooling medium employed in said engine.

It is yet another object of this invention to provide an energy conversion apparatus which incorporates in its construction a heat exchanger having features that facilitate its rapid cleaning at a minimum of down time.

It is still a further object of this invention to provide a design in an energy conversion apparatus which effects proper discharge and removal of any condensate formed within its heat exchanger to thereby prevent its settlement therein or draining detrimentally back into the connecting combustion engine.

It is an additional object to provide a system of use of a plurality of the energy conversion apparatuses of this invention wherein the apparatuses not being utilized are maintained filled with heated cooling liquid and primed for immediate usage, and which further provides for the continued operation and interaction of the remaining apparatuses when one or more of them become impaired or inoperative.

Other objects will become apparent to those skilled in the art in the light of the following description and accompanying drawings.

SUMMARY OF THE INVENTION

In accordance with this invention, generally stated, an energy conversion apparatus for use in creating vapor pressure is used in association with a standard internal combustion engine. The liquid cooling medium that absorbs a substantial amount of the heat created in the operating engine passes, either by natural convection or by forced circulation, into the energy conversion apparatus wherein the liquid phase of the cooling medium, not vaporized, settles into the downward portion of the apparatus with the heated vaporous portion flashing into the upper part of said apparatus. While this natural separation of the liquid and vapor is occurring within the apparatus, the exhaust gases formed in the operating engine are channelled through a heat exchanger arranged transversely through the liquid space of said apparatus. Having a heat exchanger disposed at this location within the apparatus accomplishes a twofold purpose. Firstly, the hot exhaust gases are brought into heat exchange relationship with the remaining liquefied portion of the cooling medium at that instant when it is most susceptible for change into the vapor. The cooling medium at this moment will have just flashed-off into vapor a substantial amount of the heat absorbed from the combustion engine, and the remaining liquid that has not vaporized maintains a temperature that is just short of the degree of vaporization. As these exhaust gases are channelled through the heat exchanger, additional vapor is readily created by heat transfer from the proximate exhaust. Such an arrangement enhances the vapor producing efficiency of the apparatus. Secondly, with the heat exchanger arranged through the apparatus wherein the heated cooling medium initially enters and is retained, it can be seen that such an arrangement is not constructed to provide for violent agitation of the liquid medium, but to the contrary, induces its uniform centrifugal movement or causes settlement of the liquid into a quiescent state as soon as possible. In this manner, as the exhaust gases create additional vapor from the cooling medium, a lesser amount of moisture escapes from the liquid or is conveyed with the vapor. Where the liquid cooling medium is agitated, a greater amount of moisture permeates the vapor, is carried with it, and may be a detriment to any other device it acts upon.

As previously mentioned, the exhaust gases are diverted for multiple passes through the energy conversion apparatus, and a series of parallel aligned tubes are used as a heat exchanger to accomplish the energy conversion process. The series of tubes located at the uppermost level of the tube bundle and proximate to the water line of the apparatus contains the greater number of tubes, with the number of tubes contained within the next succeeding lower passes or levels containing equaling or lesser number of tubes. The reason for this arrangement may be found in an analyzation of the physical relationship between the temperature, pressure and volume of gases. Ordinarily, where the temperature and pressure of a gas is found to be decreasing, such is usually induced by an increase in the volume of the gas. And, it follows that where the temperature and pressure of a gas are increased, the volume of the gas may be accordingly decreasing. Thus, in the heat exchanger of this invention, it is desirable to maintain a constant transfer of heat from the exhaust gases passing therethrough into the surrounding cooling medium. But, since these gases are constantly dissipating their heat to the surrounding liquid medium, thereby theoretically decreasing their temperature, pressure, and volume, it is essential in an attempt to maintain constant pressure and heat exchange, that the volume or size of tube passage at each adjacent lower level be decreased. When the heat exchanger is constructed in this manner, the velocity of its internal exhaust gases is held reasonably constant, and the movement of the gases through the tube bundle is properly controlled to provide for efficient and uniform heat transfer.

To further enhance the utility of the apparatus of this invention, the inlet providing for admittance of the exhaust gases into the heat exchanger is constructed in a downfeed arrangement. Therefore, any moisture or condensate developing during either start-up of the operation, during its continued operation, or after being shut-off, will be precluded from draining back into the combustion engine, or the line conveying the exhaust to the apparatus. Such is desirable to prevent the condensate from damaging and causing corrosion of these named parts. In addition, the exhaust outlet that releases the spent gases from the apparatus is downwardly orientated so as to provide for drainage of any such moisture away from the apparatus.

The invention further contemplates the problems associated with prior art heat exchangers used for energy conversion purposes which present difficulties, especially in their maintenance. To rectify any problem, the alignment of the heat exchanger and its integral tube bundle within the apparatus is arranged at an angle of approximately 45° with the longitudinal axis of the combustion engine connecting with the apparatus. When aligned in this manner, a worker may have clear access into the tube bundle without encountering interference from the associated combustion engine, nor from any closely adjacent apparatus. Frequently, when exhaust gases are conveyed through any conduit such as the tube bundle of the present apparatus, carbon and other gaseous deposits from the exhaust gradually line and thicken upon the interior of the tubes, and eventually impair their heat exchange characteristics. For this reason, a cleaning out of the tubes is often necessary and essential, and to further aid in this process, the exhaust diversion chambers positioned at either end of tube bundle of this invention are provided with spacious openings. These openings are located laterally and in alignment with the aforesaid sets of tubes, thereby allowing direct lineal access therethrough for use of a brush, or the like, for cleaning purposes. After cleaning, and prior to functioning of the apparatus, sealing covers are easily mounted upon each opening and provide their closure to prevent the escape of the exhaust gases during operation.

In many installations where the total energy concept is utilized, the amount of power consumed is greater than the amount of energy that one energy conversion device can furnish. Consequently, it has frequently been necessary to employ a plurality of said devices, and ordinarily, to have continuity of operation between devices, they interconnect between their vapor and liquid spaces providing uniformity as a vapor source. Such an arrangement is desirable especially when one device is operating and it is necessary to maintain a connecting idle device primed with liquid for ready usage. A major problem with the systems thus far developed is that a breakdown of one device forces a shutdown of all the remaining ones. And, a secondary fault with some arrangements is that there was no interrelationship between liquid spaces in adjacent apparatuses in a system so that the liquid in the inoperative device would not be warmed sufficiently to commence its energy producing operation soon after start-up. The present invention alleviates this problem by constructing in each apparatus a down drain which opens at its upper end within the vapor space regions of the apparatus, and extends downwardly entirely through and to the lower regions of the apparatus. A steam trap connects with the downward end of the drain exteriorly of the apparatus and allows the passage of overflow water, but prevents the release of the internal vapor. With this structure, each idle apparatus is prevented from flooding, while simultaneously the down drain of said idle apparatus retains the heated vapors shared from the interconnected operating apparatus, with said down drain further functioning to exchange heat and effectively elevate the temperature of the liquid cooling medium held within its apparatus. As a result, any connecting nonoperating apparatus is always prepared for immediate usage.

BRIEF DESCRIPTION OF THE DRAWING

In the drawings;

FIGURE 1 is a perspective view of the energy conversion apparatus of this invention shown connecting with an internal combustion engine;

FIGURE 2 is a vertical sectional view taken along the line 2—2 of FIGURE 1;

FIGURE 3 is a horizontal sectional view of the energy conversion apparatus taken upon the line 3—3 of FIGURE 2;

FIGURE 4 is an interior view of a cover for one of the exhaust chambers taken along the line 4—4 of FIGURE 3;

DESCRIPTION OF THE PREFERRED EMBODIMENT

Figure 6:
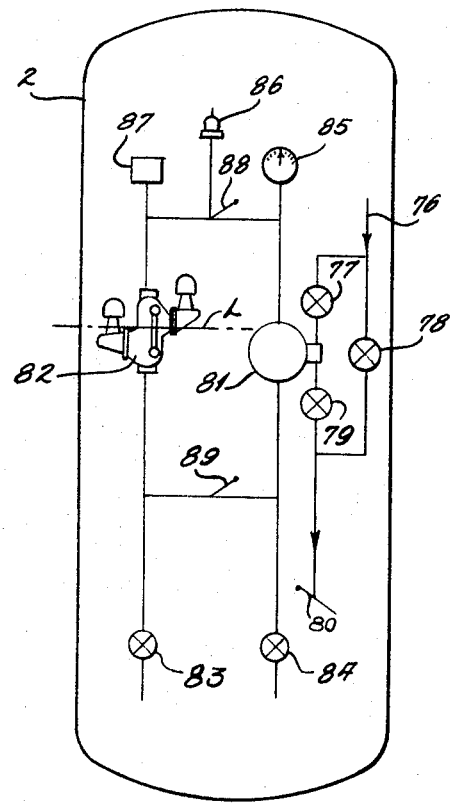
FIGURE 6 is a diagrammatic view of the instruments and controls that provide for regulation of the liquid and vapor phases during operation of the energy conversion apparatus.

Referring now to the drawings for an illustrative embodiment of the energy conversion apparatus of this invention, in FIGURE 1, reference character A generally designates the apparatus. The energy conversion apparatus is shown connecting to an internal combustion engine 1, which during operation is the prime mover providing torque for working of, for example, a generator (not shown). The apparatus A comprises a receptacle 2, being generally vertically disposed, which is supported in its upright position by a pair of mounts 3 that rest upon the skids 4. The skids are useful for facilitating movement of the apparatus, but also insure its stability to remain stationary during performance of the apparatus. One or more conduits 5 convey the heated liquid cooling medium from the jacket of the combustion engine to the receptacle, and the pressure necessary for accomplishing this movement may be acquired from the natural convection of the heated liquid, or by any common method of pumping. Within the receptacle, as has been previously described, a portion of the hot cooling liquid flashes to steam, and the remaining liquid settles downwardly therein. This remaining liquid, which will be somewhat cooled as a result of most of its heat, as absorbed from the engine, having been just flashed to vapor, is returned to said engine through the conduit 6. Mounted integrally through the receptacle is a heat exchanger 7 which includes a pair of exhaust chambers 8 and 9, that are positioned laterally to the side of said receptacle. The heat exchanger functions to transmit the exhaust gases emanating from the combustion engine into and through the apparatus, and to extract the heat of the gases for use in further elevating the temperature of the cooling liquid entering the apparatus, and thereby accomplish additional vaporization. Under this arrangement, the normally expendible exhaust gases are rendered of utility, and are utilized in a manner and at a location where they are most effective for providing maximum supplemental vaporization of the liquid cooling medium. The exhaust gases pass from the combustion engine to the exhaust chamber 8 of the heat exchanger by means of the conduit 10, and it is to be particularly noted that this conduit connects in a down-feed arrangement onto the exhaust chamber, thereby preventing any condensate or moisture formed within the heat exchanger from counter-flowing back into the engine. For the same reason and purpose, the conduit 11 which comprises the outlet for the exhaust attaches to the underside of the other exhaust chamber 9, and while allowing for the discharge of the exhaust passing through the heat exchanger, further provides for the drain-off of the foregoing accumulated condensates. The vapor contained in the receptacle, as it is created both by the combined action of the flashing of the heated cooling liquid and through its supplemental heating by exposure to the exhaust gases, is discharged from said receptacle through the steam outlet tube 12. By means of this tube, the created vapor may be conveyed to a remote location and utilized as a source of energy for operating any additional mechanism that functions by means of vapor pressure.

A more detailed disclosure of the energy conversion apparatus is shown in FIGURES 2 and 3. The receptacle 2 is revealed as comprising an insulated cylindrical shell 13, having top and bottom headers 14 and 15 providing it with sealed closure. Both the shell and the foregoing headers may be insulated with fiberglass, magnesium block, or the like, to decrease heat loss and prevent leakage. The receptacle during usage is vertically disposed, and divides into an imprecise vapor space 16 and a liquid space 17. The surface 18 of the liquid within the receptacle, remains substantially free from obstruction or violent agitation, and thereby is more inducible to a uniform formation of steam by flashing at that moment of the operation when the heated cooling liquid enters therein from the combustion engine. To further augment the development of a maximum quantity of good quality vapor, a baffle plate 19, being of substantially semicircular design, is mounted upon an incline to the inner wall of the shell 13 approximately above the location where one or more of the conduits 5 discharge the cooling liquid into the receptacle. In this position, the plate conveniently prevents any moisture, as is naturally emitted into the vapor space approximate the area where slight agitation occurs where the liquid enters into the receptacle, from becoming entrained in the flow of movement of said vapor out of the receptacle through the outlet tube 12. It has been found that much of the moisture entering the receptacle at this location forms or adheres upon the underside of this plate 19 and eventually accumulates and drains downwardly into the liquid space 17. Under this arrangement, the vapor created in the vapor space remains substantially moisture free without having been subjected to any additional operation such as superheating.

It is desirable to incorporate means for preventing flooding of the interior of an idle apparatus by the accumulation of condensation, and to effectively accomplish this objective, a drain pipe 20 is disposed within the receptacle, having its upper end 21 projecting slightly above the usual high liquid level of the fluid that is deposited and contained within the liquid space 17. The lower end 22 of the drain pipe extends through the shell at a downward location of the receptacle, and engages with a common vapor trap 23 that allows for passage of any liquid entering into said pipe, but precludes the release of any vapor contained therein. This pipe serves a twofold purpose; it allows for the discharge of any excess liquid deposited in the receptacle, thereby preventing its flooding, and also serves as a form of heat exchanger for the heated vapor contained therein, transferring its heat into the surrounding liquid, maintaining the apparatus ready primed for quick usage from a standby, nonoperative position. This latter feature will be hereinafter more fully described.

Other functional features of the apparatus, as they are disclosed mounted on the receptacle 2, include the vapor outlet tube 12 which is connected by means of the threaded sleeve 24 securely to the header 14. Also, connecting to this header is a safety valve 25 which allows for release of any excess vapor pressure that has accumulated and built up in the apparatus. Projecting from the side of the shell 13 of the receptacle is a surface blow-off pipe 26 that may be periodically, manually opened to allow for the vapor pressure to induce a rapid discharge of the surface liquid and any impurities that may have settled thereupon through said pipe and be removed from the receptacle. This conveniently provides a quick method for the removal of any surface liquid and dirt. Provided upon the receptacle, approximately intermediate to where the conduits 5 connect with said receptacle, is an inspection port 27, which upon opening provides an aperture of sufficient dimension to allow for visual inspectional into the receptacle, or even passage of a hand and arm into its interior. Connecting with the bottom header 15 is a manually operated valve 28 that may be opened when desired to provide for full or partial drainage of the liquid from the receptacle and to flush out any sedimentation.

The heat exchanger 7 is constructed as part of the total energy conversion apparatus, as more clearly shown in FIGURES 2 and 3. The lateral exhaust chambers 8 and 9 are mounted to the sides of the shell portion of the receptacle, and provide support for the series of tubes 29 that extend transversely through the liquid space 17 of the apparatus. The ends of the tubes in the tube bundle are structurally supported by the plates 30 and 31, of the exhaust chambers 8 and 9, respectively, and said plates further function to segregate the exhaust gases passing through the exhaust chambers and eventually through the series of tubes from the liquid contained in the receptacle, while still maintaining an efficient heat exchange relationship between these two elements. The tube bundle is arranged substantially centrally through the receptacle, which conveniently provides lateral spacings 32, 33 between the sides of the tubes and the wall of the receptacle. See FIGURE 3. Provision of these spacings in this arrangement allows the liquid in the receptacle to freely descend, as during the continuous discharge of said liquid out of the apparatus during operation by means of the conduit 6, without any substantial interference or obstruction from the tubes, while yet maintaining sufficient heat exchange relationship between the passing liquid and said tubes.

Figure 5:
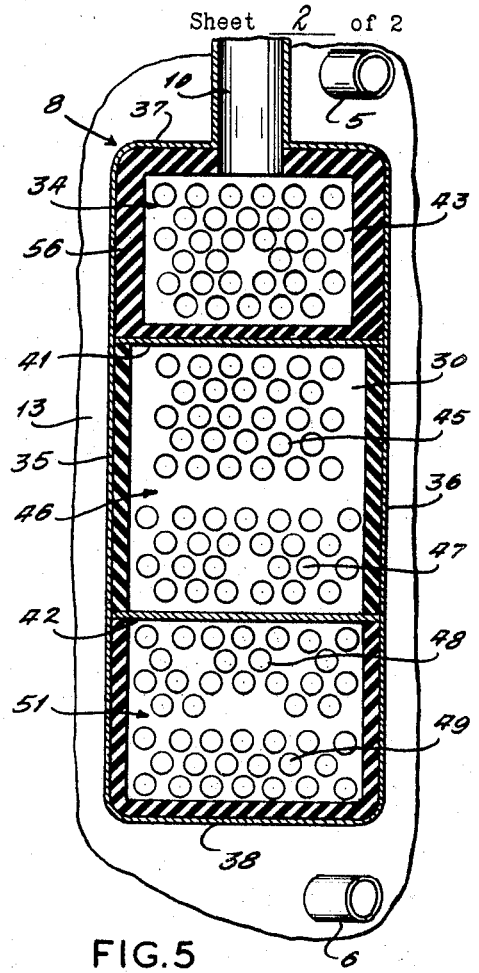
FIGURE 5 is an interior view of an exhaust chamber, showing an end view and pass arrangement of the tube bundle, taken along the line 5—5 of FIGURE 3.

The exhaust chambers 8 and 9, are substantially rectangular in dimension, as depicted in FIGURE 5, and are partitioned to form internal chambers, such as at 34, through which the incoming gases may be diverted into and through the open ends of the adjacent tube passes. Each exhaust chamber is comprised of side walls 35 and 36, and has an integrally connecting top wall 37, and a bottom wall 38. The inner edge of each exhaust chamber tightly engages to the shell 13 of the receptacle, and slightly project as flanges 39 and 40 into its interior. See FIGURE 2. In addition, each exhaust chamber is proportionately subdivided into channels, such as formed by means of the partitions 41 and 42, within the exhaust chamber 8, so as to provide areas through which the exhaust gases may be diverted for subsequent multiple passes through the horizontally aligned levels of the tube bundle 29. For example, the hot exhaust gases conveyed to the apparatus through the conduit 10 are emitted into the channel 34, and immediately diverted into and through the first level or pass 43 of the tube bundle. After passing through this first series of tubes, the gases are leased into the channel 44, and are then immediately directed into the next adjacently lower tube pass 45, for repassing in an opposite direction through the receptacle and to the channel 46. In a like manner, the gases continue to pass in sequence through the next lower level of tubes 47, 48 and 49, and in so doing are repeatedly diverted for each pass by means of the laterally disposed channels 50, 51 and 52, until the expended gases finally pass into the exhaust outlet conduit 11. The conduit 11 connects with a stack 53 that rests upon a base 54, and the exhaust gases freely pass into said stack and are conveyed away for final removal. Any condensate or moisture formed within the heat exchanger due to the presence of the exhaust gases is eventually drained out and evacuated from the apparatus through the conduit 11, and discharged from the drain 55.

Since the exhaust gases first entering the apparatus initially pass in succession through the upper channels 34 and 44, and with the gases at this stage containing the greater quantity of heat than at any time during their exposure to the apparatus, there may be provided thicker coverage of heat insulating material, such as shown at 56, in these upper channels of the exhaust chambers, than is contained in the lower regions. Evidence of this is shown by the presence of more insulation 56 upon the partitions 41 and 57, forming the lower surfaces of the channels 34 and 44, than there is insulation utilized upon the lower partitions 42 and 58 of the lower channels. Any form of heat insulation material, such as formed of fiberglass or asbestos, may be used for the foregoing purpose.

The outer surfaces of each exhaust chamber 8, 9, that are disposed remotest from the receptacle are provided with openings therethrough, which are normally maintained in closure by means of removable covers 59 and 60. These covers, particularly during operation of the apparatus, are normally fastened by means of bolts 61, tightly to the flanges 62, 63, comprising an integral part of each exhaust chamber. The covers 59, 60 are nearly identical in structure, and to facilitate their removal upon opening, may be constructed as davit doors which are suspended by means of an arm 64 that provides pivoting into either opening or closure. See FIGURE 4. The arm 64 pivotally mounts within a sleeve 65 which is permanently attached by means of a bracket 66 to the side of the exhaust chamber. See FIGURE 3. The other end of the arm 64 is connected by a loose bolt attachment 67 to the top of the cover. Each cover is constructed having an outer plate 68, 69 (see FIGURE 2), which is lined with heat obstructing insulating material 70 so as to prevent the aforesaid plates from becoming elevated in temperature, radiate heat, and a hazard to the surrounding area. A perimeter flange 71 forms integrally with each plate and provides side coverage and support for the insulation, and also provides support for the perpendicular mounting flanges 72. The foregoing flanges are arranged for mounting flush with the flanges 62, 63 of each exhaust chamber, and all said flanges are provided with aligned openings 73 therethrough wherein the bolts 61 may be inserted and fastened when it is required to secure the covers to said exhaust chambers. Each cover, like its associated exhaust chamber, is partitioned and insulated proportionately. For example, the partitions 74, 75, of cover 59 are so arranged and support an amount of insulation in both the upper and lower channels matching portions so as to conform with the partitions and insulation of the exhaust chamber 8, to which said cover mounts. It should be noted that the arrangement of the openings in each exhaust chamber, which the covers 59 and 60 enclose, provide a direct lineal access, in alignment, completely through the apparatus. The various chambers and the tube bundle are so positioned that upon removal of the foregoing covers any form of cleaning instrument may be inserted directly within and through the tubes so as to allow for cleaning of their interiors. Such is frequently required for removal of any carbon or other dirt deposits that may have accumulated and line the tubes, thereby decreasing the efficiency of operation of the heat exchanger.

It is significant to note that at each level of the series of tubes, or at each tube pass, the tube level or pass located in the upward region of the apparatus contains a greater collection of tubes than do the tube passes positioned downwardly therefrom. As previously discussed, the relationship between the temperature, pressure and volume of a gas is relative, so that as the hotter gases initially pass through the upward level of tubes of the tube bundle, a greater number of tubes having a larger capacity for volumetric flow of gas is provided, than may be provided for in the downward regions of the tube bundle. At this moment the gasses have the highest temperature and pressure, than during any subsequent pass. As the exhaust gases continue to make more passes through the tube bundle, their dissipation of heat causes their temperature and pressure to decrease, and unless a smaller volume tube pass is provided for regulating the gas flow, the transmission of heat from said gases into the liquid cooling medium will be substantially lessened, decreasing the efficiency of operation of the heat exchanger. For this reason, a predesigned lesser number of tubes are provided in the lower passes of the tube bundle, thereby lessening the volume through which the exhaust gases may flow, and maintaining the velocity of the gases substantially uniform and constant throughout their multiple passes through the tube bundle. In this manner, the heat dissipation of the heat exchanger is maintained relatively uniform throughout all passes of the tube bundle, causing the heat exchanger to consistently dissipate the heat of its exhaust gases traversing therethrough into the cooling medium, creating a maximum of supplemental vapor.

Various forms of controls are provided for operation of the energy conversion apparatus, and are shown diagrammatically in FIGURE 6. It is essential in any form of heat and pressure functioning device that various regulating mechanisms responsive to the foregoing forms of energy must be provided so as to produce efficient operation of the apparatus, and with a degree of safety. Although the apparatus of this invention substantially operates in conjunction with the cooling liquid as contained in the jacket of an internal combustion engine, it is frequently necessary to supplement said liquid by replacing that which has been removed in the form of vapor. Hence, a liquid inlet 76 connects to a source of the cooling medium, whether it be water or any other form of fluid, and the movement of said liquid through the inlet tubes is controlled by a series of adjustable valves 77, 78 and 79. By manually opening the valve 78, the liquid may be allowed to pass through line 80, and be emitted into the liquid space of the apparatus, thereby adding to the supply of cooling liquid contained therein. When the valves 77 and/or 79 are opened they provide for flow of liquid to the mechanical emergency feeder 81 that functions to allow for controlled passage of additional liquid into the apparatus automatically as when the level of liquid contained therein reaches an inordinate low level, such as during a breakdown through leakage, or when a substantial amount of the liquid has been converted into vapor. Normally, the fine regulation of the level of liquid contained within the apparatus is the function of the liquid level control 82. This control, which includes a multiple of electrical and mechanical switches, and the like, which triggers operation of a pump, such as pump 110, and a safety alarm, is of the type manufactured by the McDonnell-Miller Company, of Chicago, Ill., having Ser. No. 291–6–5, and functions automatically by means of its internal liquid floats and responsive switches to allow for additional feeding of liquid, as through line 80, into the apparatus in the event that a low water level occurs, and also functions to shut off the adding of liquid into the system when the liquid reaches the proper operating level L. It is to be noted that the liquid level control 82 is the principal control of feeding of additional liquid into the apparatus, and that the mechanical feeder 81 only functions in the event that said control 82 becomes inoperative. The passage of liquid into the apparatus, after the function of the control 82 or the feeder 81, is provided through the line 80. A series of blowdown valves 83 and 84 are positioned for manual operation when it becomes necessary to flush out any liquid and contaminants in the control lines or from the liquid space of the apparatus.

It is equally important to regulate the amount of vapor pressure developed in the apparatus. A pressure gauge 85 provides a quick reading of the amount of steam pressure that has built up at any given moment within the apparatus, and a vent valve 86 allows for release of air, and under certain conditions prevents the formation of a vacuum within the apparatus, as during drainage. A steam pressure alarm switch 87 signals that the amount of pressure in the vapor space is approaching or has reached the danger zone. The vapor in the apparatus acquires access to the foregoing gauges and valves through line 88 that attaches directly into the vapor space of said apparatus. Liquid enters into the apparatus through line 89 and raises the level of the liquid therein into proximity of the liquid level control 82 to induce its functioning.

Figure 7:
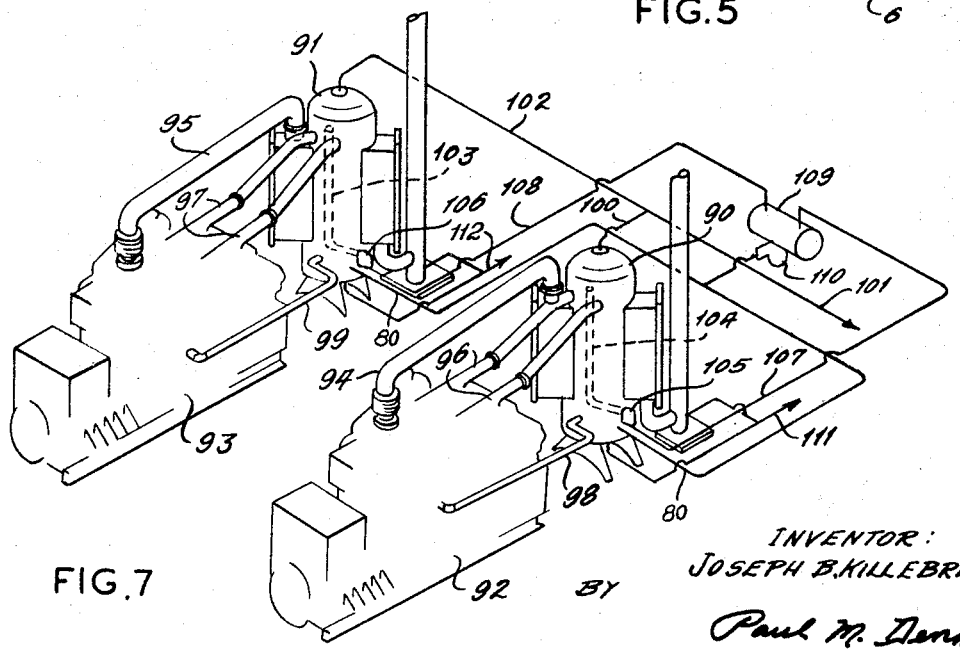
FIGURE 7 provides a perspective diagram of the system for interconnecting a pair or more of the energy conversion apparatuses and their associated engines.

The diagram for a system of combined use of a plurality of the energy conversion apparatuses of this invention is revealed in FIGURE 7. Frequently, the quantity of vapor required to operate various remote mechanisms is greater than the quantity that can be supplied by a single apparatus, and therefore, additional apparatuses must be interconnected into a system in order that it supply the total amount of the vapor energy requirements. But also, where a system of such apparatuses has been set up, frequently the amount of vapor energy needed may be satisfied by one operating unit, therefore allowing the other apparatus to be maintained inoperative and on standby. As shown, a pair of interconnecting apparatuses 90 and 91 are attached for cooperating with their adjacent combustion engines 92 and 93, respectively. Each combination is provided with an exhaust conduit 94, 95, that supplies, when the engines are operating, hot exhaust gases to the apparatuses. In addition, each combined apparatus and engine is provided with conduits 96 and 97 that convey the hot cooling liquid to the apparatuses, and are further interconnected by means of the conduits 98 and 99 that return the cooling liquid to the engines. When, for example, the apparatus 90 is operating, and the apparatus 91 is maintained on standby, the vapor generated within the apparatus 90 passes through the line 100 and into the line 101 for transfer to a remote point for use in operating some other mechanism. But, a portion of the created vapor passes back through the line 102 and into the apparatus 91 wherein said vapor has a tendency to pervade throughout the vapor space of said apparatus, and also acquire entrance into its drain pipe 103. When this condition occurs, the vapor effectively raises the temperature of the liquid contained in the nonoperating apparatus 91, and eventually cause its circulation through the engine 93 by convection. Also, the elevation of the temperature of the liquid contained in the apparatus 91 is more efficiently performed because the drain pipe 103 with the vapor contained therein extends for the full height of the liquid space, and functions in itself as a heat exchanger, further elevating the temperature of the liquid contained in the standby unit. By raising the temperature of the liquid contained in the standby apparatus 91, through the use of the vapor that has backed up from the operating apparatus 90, the former apparatus is primed for ready operation in the event that it becomes necessary to develop additional vapor pressure in the system upon a moment's notice. By use of the drain pipes 103 and 104, and their connecting steam traps 105 and 106, the steam that has backed into a standby apparatus is condensed therein, and only the condensate is allowed to pass through said steam traps and move through the line 107, 108, and into receiver 109. A pump 110 may be periodically energized for reconveying this surplus liquid back into the liquid spaces of the various apparatuses when desired. Any condensate that has formed within the heat exchanger of either apparatus, or which is released by means of opening of a valve, such as the valve 28 in FIGURE 2, connecting to the bottom of each apparatus, may be discharged to a drain through the lines 111 and 112. In the use of the system, as heretofore described, both temperature and liquid levels may be independently maintained in both the operating and standby apparatuses, and any breakdown in one or the other of said apparatuses has little effect upon the operativeness of the remaining apparatus.

Numerous variations in a construction of the energy conversion apparatus of this invention will occur to those skilled in the art in the light of the foregoing disclosure. In addition, various modifications may be made in the system of using a combination of these apparatuses without departing from the teachings of this invention. For these reasons, these variations or modifications are intended to be included within the scope of this invention and be protected by the appended claims.

Having thus described the invention, what is claimed and desired to be secured by Letters Patent is:

1. In combination with a combustion engine or the like of the type including a circulating vaporizable liquid cooling medium and producing heated exhaust gases during operation, an energy conversion apparatus comprising a receptacle having a liquid space therein with a space for vaporized cooling medium located thereabove, at least one conduit interconnecting between the combustion engine and said aparatus and providing the means for conveyance of heated cooling medium into the receptacle wherein the vapor phase of said medium separates and rises into the vapor space, with the remaining liquid medium depositing and admixing within the liquid space, means connecting to said receptacle at the location of said vapor space for conveying said vapor from the apparatus, a return conduit connecting between the apparatus and the combustion engine and providing for passage of the cooling medium from the liquid space back into said combustion engine, a heat exchanger connecting with said receptacle and disposed in heat exchange relationship through the liquid space in the receptacle, means conveying said exhaust gases from the combustion engine and to the apparatus for passage through said heat exchanger wherein the cooling medium proximate said heat exchanger is further heated and forms additional vapor which supplements the vaporized cooling medium in the vapor space.

2. The energy conversion apparatus of claim 1 wherein said heat exchanger extends transversely approximately centrally through said receptacle, there being spacings provided intermediate the heat exchanger sides and the receptacle providing for the unencumbered flow of the liquid cooling medium downwardly through said receptacle.

3. The energy conversion apparatus of claim 1 wherein said heat exchanger comprises a tube bundle disposed transversely through the receptacle, said tube bundle comprised of a series of tubes providing for multiple passes of the exhaust gases through the receptacle, the direction of movement of the exhaust gases through each tube pass being substantially opposite to the flow of movement of the exhaust gases through the tube passes located approximately above and below thereof, a pair of exhaust chambers connecting to each end of said series of tubes, an exhaust inlet connected with and providing for the admittance of the exhaust gases from said conveying means into the first exhaust chamber, an exhaust outlet connecting with the second exhaust chamber and providing for the discharge of gases away from the apparatus, said exhaust chambers being partitioned to form internal channels through which the gases leaving a tube pass may be directed into and through the next adjacent tube pass.

4. The energy conversion apparatus of claim 3 and further characterized by each exhaust chamber having an opening provided therein allowing for access into the internal channels and through the series of tubes, and a removable cover providing closure for each opening to prevent the escape of exhaust gases during functioning of said apparatus.

5. The energy conversion apparatus of claim 4 wherein said openings, channels, and tubes are disposed substantially in alignment providing for lineal access completely through the apparatus when the chamber covers are removed, this alignment of said apparatus being arranged at an angle with the longitudinal axis of the connected combustion engine thereby providing substantial clearance for removal or application of the covers from said chamber openings, and access into and through the channels and tubes.

6. The energy conversion apparatus of claim 3 wherein the exhaust inlet connects with the top of the first exhaust chamber thereby requiring the flow of the exhaust gases during entrance into the chamber to be in a substantially downwardly direction and thereby preventing any condensate formed and entrained in the exhaust and heat exchanger from returning to the combustion engine, and said exhaust outlet being connected to the bottom of the second exhaust chamber thereby providing for any condensate formed within the heat exchanger to be conveyed away and drained from the apparatus.

7. The energy conversion apparatus of claim 3 wherein the tube pass located uppermost in the receptacle first receives the exhaust gases entering the apparatus, and said tube pass containing a larger number of tubes than the tube pass located lowest in said receptacle, the number of tubes contained in each tube pass of the series of tube passes being of a same or larger number than a number of tubes contained in the tube pass located directly therebelow, and said uppermost tube pass being fixed in proximate to the liquid level in said receptacle, said tube passes inducing the formation of additional vapor during functioning of said apparatus.

8. The energy conversion apparatus of claim 2 and further characterized by a drain pipe provided in the receptacle, the upward end of said pipe projecting slightly above the high water level of the liquid cooling medium contained in said receptacle and providing for a drain-off of excess liquid, the downward end of said pipe extending exteriorly through the lower region of the receptacle, a vapor trap connecting with said downward end of the pipe and preventing passage of the vaporized medium while simultaneously permitting the drainage of any condensate, said drain pipe being vertically disposed through one of the spacings intermediate the heat exchanger and the receptacle.

9. The energy conversion apparatus of claim 8 and further characterized by a baffle plate being connected to the receptacle and arranged in its vapor space, said plate extending laterally upon an incline partially across the receptacle and being disposed over the upward end of the drain pipe and the location of connection to the receptacle of the conduit conveying the cooling medium therein, said plate provided for shielding against the admixture into the vapor space of any moisture created by means of the agitated liquid cooling medium being discharged into the receptacle.

10. In the combined use of a pair or more of energy conversion apparatuses, each apparatus being of the type as defined in claim 8, a conduit interconnecting between the vapor space of each receptacle thereby providing for the mutual exchange of vapor between the apparatuses and effecting temperature averaging of the liquid cooling medium contained in each apparatus, a pipe for each apparatus attaching at one end to the outlet side of the vapor trap, a receiver connecting with the other end of each pipe and disposed for collecting the excess condensate passing through the drain pipe of each apparatus, and means for returning the liquid in the receiver back to the apparatuses.

11. The energy conversion apparatus of claim 1 wherein said heat exchanger extends transversely approximately centrally through said receptacle, said heat exchanger formed to provide for multiple passes of the exhaust gases through the liquid space of the receptacle and therein create additional vapor which supplements the vaporized cooling medium disposed in the vapor space.

12. The energy conversion apparatus of claim 11 wherein the heat exchanger is formed to provide for a reduction in the volumetric flow of the exhaust gases during each pass subsequent to their initial pass through the liquid space of the receptacle.

References Cited

UNITED STATES PATENTS 2,702,026 2/1955 Dalin _____ 122—7 XR
3,223,150 12/1965 Tramontini _____ 122—7 XR

FOREIGN PATENTS 666,061 7/1963 Canada.

KENNETH W. SPRAGUE, *Primary Examiner.*